(12) United States Patent
Spallaccini et al.

(10) Patent No.: US 12,174,889 B2
(45) Date of Patent: Dec. 24, 2024

(54) METHOD AND SYSTEM FOR ANALYZING AND INTERACTING WITH CENTRALIZED TELECOMMUNICATION NETWORKS THROUGH MULTI-LAYER GRAPHS

(71) Applicant: HCL America Inc., Sunnyvale, CA (US)

(72) Inventors: Paolo Spallaccini, Vimodrone (IT); Yossi Altevet, Tel Aviv-Jaffa (IL); Irshad Pookunju, Minato (JP)

(73) Assignee: HCL America Inc.

( * ) Notice: Subject to any disclaimer, the term of this patent is extended or adjusted under 35 U.S.C. 154(b) by 66 days.

(21) Appl. No.: 17/833,961

(22) Filed: Jun. 7, 2022

(65) Prior Publication Data

US 2023/0394085 A1 Dec. 7, 2023

(51) Int. Cl.
*G06F 16/90* (2019.01)
*G06F 16/27* (2019.01)
*G06F 16/901* (2019.01)
*G06N 20/00* (2019.01)

(52) U.S. Cl.
CPC .......... *G06F 16/9024* (2019.01); *G06F 16/27* (2019.01); *G06N 20/00* (2019.01)

(58) Field of Classification Search
CPC ...... G06F 16/9024; G06F 16/27; G06N 20/00
See application file for complete search history.

(56) References Cited

U.S. PATENT DOCUMENTS

| | | | |
|---|---|---|---|
| 9,602,415 | B2 | 3/2017 | Mestery et al. |
| 9,870,534 | B1* | 1/2018 | Wu ..................... H04L 41/149 |
| 9,916,187 | B2 | 3/2018 | Schmid et al. |
| 10,409,782 | B2 | 9/2019 | Zhang et al. |
| 10,530,796 | B2 | 1/2020 | Patterson et al. |
| 10,904,367 | B2 | 1/2021 | Goel et al. |
| 11,057,278 | B1* | 7/2021 | Côté ..................... H04L 41/16 |
| 11,212,306 | B2 | 12/2021 | Patterson et al. |
| 2017/0289187 | A1* | 10/2017 | Noel .................. G06F 16/9024 |
| 2018/0375718 | A1* | 12/2018 | Anand ................. H04L 41/082 |

(Continued)

FOREIGN PATENT DOCUMENTS

EP 3849154 A1 7/2021

*Primary Examiner* — Hares Jami
(74) *Attorney, Agent, or Firm* — Kendal M. Sheets

(57) ABSTRACT

This disclosure relates to method and system for analyzing and interacting with network behavior in a centralized telecommunication network. The method includes receiving in real-time, network data from each of a plurality of access points in the telecommunication network; determining intra-layer graph data corresponding to network layers associated with the plurality of access points and inter-layer graph data corresponding to plurality of network layers based on the network data; iteratively determining network behavior parameters corresponding to each of the set of intra-layer connections and each of the set of inter-layer connections based on intra-layer graph data and inter-layer graph data; and generating a multi-layer graphical representation based on the intra-layer graph data, the inter-layer graph data, and the network behavior parameters representing at least one selected multi-relational or multiplex quality of each of relevant intra-layer relationships and inter-layer relationships in the telecommunication network.

15 Claims, 9 Drawing Sheets

(56) References Cited

U.S. PATENT DOCUMENTS

| | | |
|---|---|---|
| 2019/0279230 A1 | 9/2019 | Winner et al. |
| 2020/0201935 A1 | 6/2020 | Filipovic et al. |
| 2021/0281486 A1* | 9/2021 | Singh Bawa ............ G06N 7/01 |
| 2021/0377310 A1 | 12/2021 | Fernando et al. |
| 2022/0094614 A1* | 3/2022 | Khurshid .............. H04L 41/147 |

\* cited by examiner

METHOD AND SYSTEM FOR ANALYZING AND INTERACTING WITH CENTRALIZED TELECOMMUNICATION NETWORKS THROUGH MULTI-LAYER GRAPHS

TECHNICAL FIELD

This disclosure relates generally to telecommunication networks, and more particularly to method and system for analyzing and interacting with network behavior in a centralized telecommunication network.

BACKGROUND

In communication domain of present day, Self Organizing Networks (SONs), software-defined functions and network orchestration, analytics and data-centric processing ensure flexibility, optimal operating conditions, self-healing capabilities, and tailored services delivered to customers. Such features may also be implemented by means of Machine Learning (ML) algorithms. Closed-loop operations in networking is conceptually brought in context of an increasing networking complexity. Such concept is identifying groups of actions that are applied without an intervention of an operator, relying instead on the capability of the network to automatically determine, monitor, adjust, and optimize its own operating policies, eventually influencing performances, behavior, and shape of the network.

Above mentioned objectives may be achieved by applying learned and pre-defined behavioral models through an effective usage of multi-layer graphs, treating physical network nodes alongside selected network logical, numerical, and behavioral descriptors as diverse elements of a complex system. The multi-layer network graph framework formalism is a comprehensive tool for making analysis and synthesizing actions over complex networks. The quality of the insight gained applying graph analytics, also combined with learning techniques may unlock great potential for control optimization of network resources working conditions.

Conventionally, application of graph database to field of networking analytics has been used for some use cases, such as, anomaly detection, social networking content delivery, generic service delivery based on traffic flows information, and the like. However, in the present state of art, techniques applying graph database for wireless communication network analysis are limited and face challenges in implementation. There is, therefore, a need in the present state of art for techniques to analyze and interact with network behavior in a centralized telecommunication network using multi-layer graph analytics.

SUMMARY

In one embodiment, a method for analyzing and interacting with network behavior in a centralized telecommunication network is disclosed. In one example, the method includes receiving in real-time, network data from each of a plurality of access points in the telecommunication network through one or more user space applications. The network data includes a plurality of network layers. The plurality of network layers includes one or more of physical network layers, logical network layers, conceptual network layers, or behavioral network layers. The network data includes inter-layer network data and intra-layer network data associated with the plurality of access points. The one or more user space applications are configured to establish a communication loop between each of the plurality of access points and the central controller. The method further includes determining intra-layer graph data corresponding to each of the network layers associated with the plurality of access points and inter-layer graph data corresponding to the plurality of network layers based on the network data through a graph analytics algorithm. The intra-layer graph data includes a set of intra-layer connections associated with the plurality of access points and the inter-layer graph data includes a set of inter-layer connections between the plurality of network layers. Each of the set of intra-layer connections and each of the set of inter-layer connections includes a source node and a target node connected via one or more edges. The method further includes iteratively determining one or more network behavior parameters corresponding to each of the set of intra-layer connections and each of the set of inter-layer connections based on the intra-layer graph data and the inter-layer graph data.

In one embodiment, a system for analyzing and interacting with network behavior in a centralized telecommunication network is disclosed. In one example, the system includes a processor and a computer-readable medium communicatively coupled to the processor. The computer-readable medium store processor-executable instructions, which, on execution, cause the processor to receive in real-time, network data from each of a plurality of access points in the telecommunication network through one or more user space applications. The network data includes a plurality of network layers. The plurality of network layers includes one or more of physical network layers, logical network layers, conceptual network layers, or behavioral network layers. The network data includes inter-layer network data and intra-layer network data associated with the plurality of access points. The one or more user space applications are configured to establish a communication loop between each of the plurality of access points and the central controller. The processor-executable instructions, on execution, further cause the processor to determine intra-layer graph data corresponding to each of the network layers associated with the plurality of access points and inter-layer graph data corresponding to the plurality of network layers based on the network data through a graph analytics algorithm. The intra-layer graph data includes a set of intra-layer connections associated with the plurality of access points and the inter-layer graph data includes a set of inter-layer connections between the plurality of network layers. Each of the set of intra-layer connections and each of the set of inter-layer connections includes a source node and a target node connected via one or more edges. The processor-executable instructions, on execution, further cause the processor to iteratively determine one or more network behavior parameters corresponding to each of the set of intra-layer connections and each of the set of inter-layer connections based on the intra-layer graph data and the inter-layer graph.

In one embodiment, a non-transitory computer-readable medium storing computer-executable instruction for analyzing and interacting with network behavior in a centralized telecommunication network is disclosed. In one example, the stored instructions, when executed by a processor, may cause the processor to perform operations including receiving in real-time, network data from each of a plurality of access points in the telecommunication network through one or more user space applications. The network data includes a plurality of network layers. The plurality of network layers includes one or more of physical network layers, logical network layers, conceptual network layers, or behavioral network layers. The network data includes inter-layer network data and intra-layer network data associated with the plurality of access points. The one or more user space applications are configured to establish a communication loop between each of the plurality of access points and the central controller. The operations further include determining intra-layer graph data corresponding to each of the network layers associated with the plurality of access points and inter-layer graph data corresponding to the plurality of network layers based on the network data through a graph analytics algorithm. The intra-layer graph data includes a set of intra-layer connections associated with the plurality of access points and the inter-layer graph data includes a set of inter-layer connections between the plurality of network layers. Each of the set of intra-layer connections and each of the set of inter-layer connections includes a source node and a target node connected via one or more edges. The operations further include iteratively determining one or more network behavior parameters corresponding to each of the set of intra-layer connections and each of the set of inter-layer connections based on the intra-layer graph data and the inter-layer graph data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Further, the phrases "in some embodiments," "in accordance with some embodiments," "in the embodiments shown," "in other embodiments," and the like generally mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered as exemplary only, with the true scope and spirit being indicated by the following claims.

Figure 1:
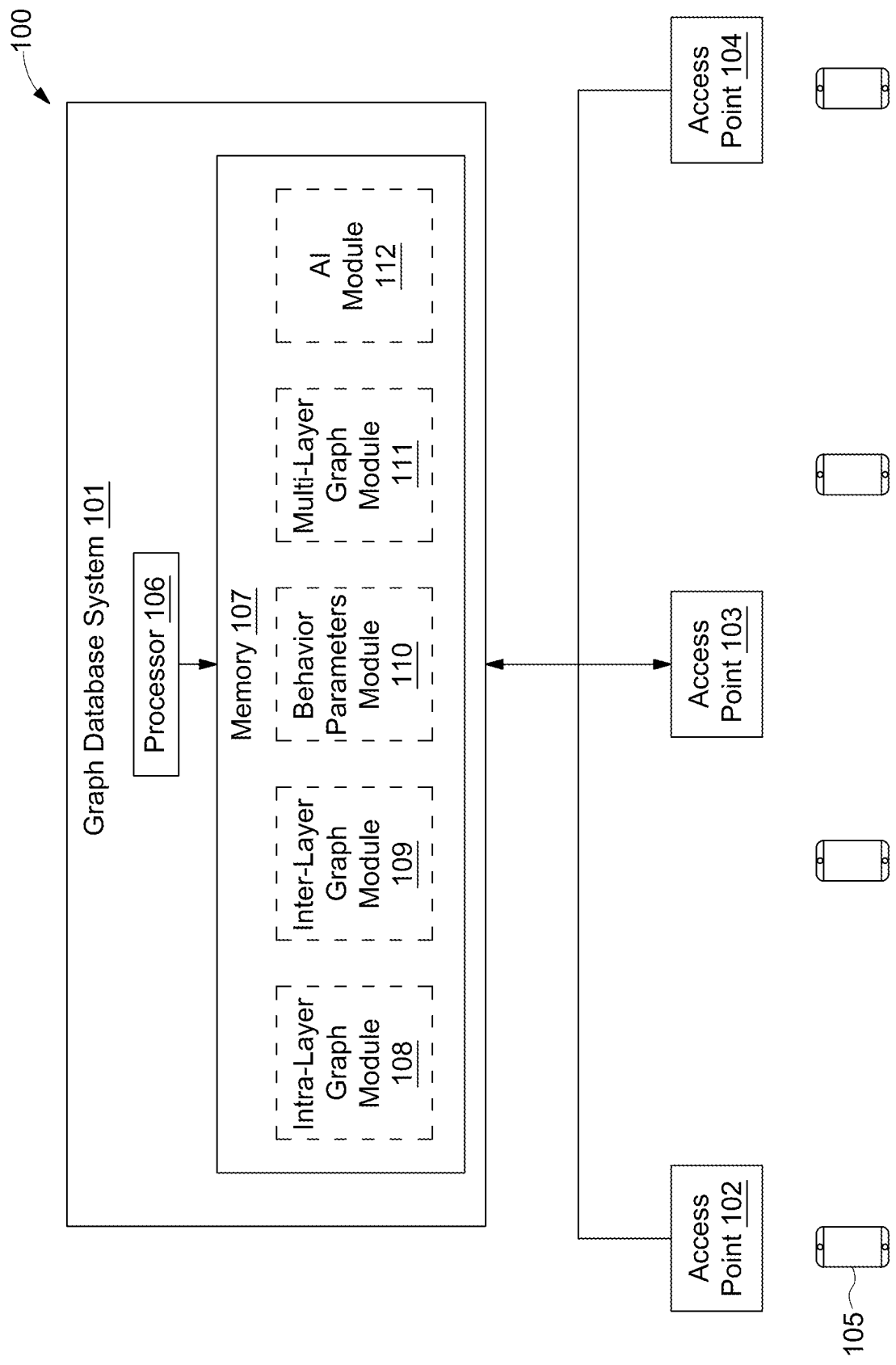
FIG. 1 illustrates a block diagram of an exemplary system for analyzing and interacting with network behavior in a centralized telecommunication network, in accordance with some embodiments of the present disclosure.

Referring now to FIG. 1, an exemplary system 100 for analyzing and interacting with network behavior in a centralized telecommunication network is illustrated, in accordance with some embodiments of the present disclosure. By way of an example, the centralized telecommunication network may be a cell phone network, a satellite communication network, a terrestrial microwave network, a Wireless Local Area Network (WLAN), a wireless sensor network, or the like. The system 100 includes a graph database system 101 (for example, a central controller) directly or indirectly communicably coupled to an access point 102, an access point 103, and an access point 104 through a lightweight communication protocol (for example, MQTT, CoAP, Lightweight Directory Access Protocol (LDAP), Lightweight Extensible Authentication Protocol (LEAP), Lightweight Presentation Protocol (LPP), Internet Content Adaptation Protocol (ICAP), Skinny Client Control Protocol (SCCP), OpenLDAP, etc.) in a star topology. Further, the system 100 includes a plurality of client devices (for example, a client device 105).

Each of the central controller 101 and the access points 102, 103, and 104 in the system 100 include one or more processors and a memory. For ease of explanation, only the central controller 101 is depicted as including a processor 106 and a memory 107. Additionally, the central controller 101 is implemented over a cloud server, in accordance with some embodiments of the present disclosure. Further, the memory 107 stores instructions that, when executed by the processor 106, cause the processor 106 to analyze and interact with network behavior in the system 100 by determining intra-layer graph data and inter-layer graph data based on network data received from each of the plurality of access points 102, 103, and 104. The memory 107 also stores various data (for example, a plurality of network layers, physical network layers, logical network layers, conceptual network layers, behavioral network layers, intra-layer graph data, inter-layer graph data, multi-layer graph data, and the like) that may be captured, processed, and/or required by the central controller 101.

In some embodiments, the central controller 101 installs one or more user space applications in the access point 102 through a lightweight communication protocol. The one or more user space applications are configured to establish a communication loop between the access point 102 and the central controller 101. Further, the access point 102 and the client device 105 include one or more sensors for data exchange. The access point 102 sends in real-time, network data through the one or more user space applications. It should be noted that the network data includes a plurality of network layers. In an embodiment, the plurality of network layers includes one or more of physical network layers, logical network layers, conceptual network layers, or behavioral network layers. The network data includes inter-layer network data and intra-layer network data associated with the plurality of access points. It should be noted that collection of network data may involve definition of custom time basis for each of the collected network data.

Further, the system 100 includes a plurality of client devices (such as, a client device 105). By way of an example, the client device 105 may be a computing device (for example, a desktop, a laptop, a server, a notebook, a netbook, a tablet, a smartphone, a mobile phone, or the like) or any additional device providing network compatibility (for example, a dongle, a Li-Fi sleeve, or the like) to a computing device. Each of the plurality of client devices is configured to exchange data with one of the plurality of access points in the system 100. For example, the client device 105 exchanges data with the access point 102.

The graph database system 101 receives network data from each of the plurality of access points and the plurality of client devices in real-time. Further, the graph database system 101 determines intra-layer network graph data and inter-layer network graph data based on the network data.

As will be appreciated by a person skilled in the art, explanations of functioning of the above mentioned modules use the access point 102 and the client device 105 as illustrative examples for simplicity of explanation and the said functioning can apply to any of the plurality of access points or the plurality of client devices in the system 100.

The memory 107 may further include a graph database system, dedicated graph analytics software services, a centralized data and message distribution system, a nodes management system, or the like. The graph database system can represent and process multiple network layers, onto centralized cloud-computing infrastructure-based services. Further, the graph database system organizes a plurality of objects, a plurality of nodes and attributes to provide a convenient, fully comprehensive representation and description of the features data set and behavior of the system 100. Further, the dedicated graph analytics software services aim at loading graph data into the graph database system. Additionally, the dedicated graph analytics software services aim at collecting data from source nodes, processing them, and distributing actions to target nodes. Further, a centralized data and message distribution system is a key information feed pipeline connecting each of the plurality of access points 102, 103, and 104 and any sensors associated with the plurality of access points 102, 103, and 104 (for example, radios of the plurality of access points, wherever present). Another principal data information feed source is the nodes management system for monitoring and reporting of dynamic operating conditions. It should be noted that targets of actions may be selected from a group including the plurality of access points 102, 103, and 104, configurable objects embedded into the plurality of access points 102, 103, and 104, and various software services included in the graph database system.

The central processor 101 further includes, within the memory 107, an intra-layer graph module 108, an inter-layer graph module 109, a behavior parameters module 110, a multi-layer graph module 111, and an AI module 112. The intra-layer graph module 108 determines intra-layer graph data corresponding to each of the network layers associated with the plurality of access points based on the network data through a graph analytics algorithm (for example, dedicated graph analytics software services). The intra-layer graph data comprises a set of intra-layer connections associated with the plurality of access points. Each of the set of intra-layer connections includes a source node and a target node connected via one or more edges.

The inter-layer graph module 109 determines inter-layer graph data corresponding to the plurality of network layers based on the network data through a graph analytics algorithm (for example, dedicated graph analytics software services). The inter-layer graph data includes a set of inter-layer connections between the plurality of network layers. Each of the set of inter-layer connections comprises a source node and a target node connected via one or more edges.

In other words, the intra-layer graph module 108 constructs network layers corresponding to the multi-layer graphical representation by identifying interconnections associated with the plurality of access points in a common layer. The inter-layer graph module 109 further determines interconnections between two or more network layers. It should be noted that the determination of intra-layer graph data and the inter-layer graph data based on an anteriorly developed strategy for optimizing the network.

The behavior parameters module 110 iteratively determines one or more network behavior parameters corresponding to each of the set of intra-layer connections and each of the set of inter-layer connections based on the intra-layer graph data and the inter-layer graph data. The behavior parameters module 110 applies algorithms that optimize at least one predefined objective functions and/or generates one or more network behavior parameters (i.e., insights corresponding to the network).

More specifically, an accurate operational description, or representation, of selected network behavior parameters may be developed based on specific objectives of targeted detection problems. In an embodiment, the AI module 112 selects the AI model from a group of AI models including a plurality of predictive models and a plurality of descriptive models based on each of the intra-layer graph data, the inter-layer graph data, and the one or more network behavior parameters.

Further, the multi-layer graph module 111 generates a multi-layer graphical representation based on the intra-layer graph data, the inter-layer graph data, and one or more selected network behavior parameters representing at least one selected multi-relational or multiplex quality of each of relevant intra-layer relationships and inter-layer relationships in the telecommunication network. The multi-layer graphical representation includes a plurality of graph elements, and wherein the plurality of graph elements includes a plurality of objects, a plurality of nodes, and a plurality of edges.

It should be noted that the relevant intra-layer relationships and inter-layer relationships are interdependent components in the telecommunication network interacting through dedicated relational channels. The interdependent components correspond to at least one of physical components, logical components, and conceptual components. Further, the multi-layer graph module 111 evaluates each of the interdependent components through appropriate data descriptors.

Further, the multi-layer graph module 111 identifies a plurality of nodes (vertices, V), for each of the plurality of network layers of the multi-layer graphical representation and a plurality of edges ($E \subseteq V \times V$) connecting the plurality of nodes to accomplish the strategy. Further, the multi-layer graph module 111 conveniently labels the plurality of nodes to account for any kind of weight, property, and in general, any kind of semantics associated with such graph components. Further, the multi-layer graph module 111 conveniently labels the plurality of edges to account for any kind of weight, property, and in general, any kind of semantics associated with a transition, to accomplish the strategy.

Further, the AI module 112 selects appropriate methods and algorithms (explicitly including Machine Learning (ML) and AI-based techniques) for traversing and analyzing the multi-layer graphical representation. The selected methods and algorithms are applied to the generated multi-layer graphical representation, to accomplish the strategy. The AI module 112 applies previously chosen methods and algorithms and analyzes results to derive required information in order to accomplish the strategy. It should be noted that the AI module 112 leverages on features of the multi-layer graphical representation to select the appropriate methods and algorithms for describing relationships updates or discovering hidden relationships. Further, for a predefined set of nodes, edges, labels, algorithms, and nature and structure of the multi-layer graphical representation, the multi-layer graph module 111 analyzes aspects that are in direct or indirect relationships with physical transmission behavior of network elements. As will be appreciated, such aspects are varying in nature and depend on multiple factors that are external to the system 100. Further, in order to accomplish the strategy, the multi-layer graph module 111 identifies one or more required actions from the derived information obtained from the analysis of the multi-layer graphical representation. It should be noted that the one or more actions may include controlling services affecting values of the plurality of objects and behavior in order to achieve a predefined objective. In some embodiments, the one or more actions may include controlling an entire network behavior by identifying modifications to values of selected configurable or controllable network objects. Further, the multi-layer graph module illiterates the analysis of the multi-layer graphical representation and identification of the one or more actions in order to implement an automatized system that is capable of continuously managing the network through closed-loop operations.

Further, in order to enable predictive and prescriptive analysis and to achieve the objectives defined by the strategy, the multi-layer graph module 111 conceives multi-layer graphical representation to incorporate an additional dimension that represents a point in time. As will be appreciated by a person skilled in the art, representation with respect to time can capture evolution or changes of the plurality of objects of the multi-layer graphical representation (i.e., the plurality of nodes and the plurality of edges) over time. Using time-based information, an ML algorithm can, for example, forecast performance of the system 100 in future and perform a 'what-if' analysis (e.g., prediction of performance when a node is added or removed from the system 100).

It may be noted that the central controller 101 develops appropriate and dedicated software services for graph analytics and for diverse analytics and actions processing needs specified by the above mentioned steps, in order to accomplish the developed strategy through the multi-layer graphical representation and, in order to implement various embodiments of the system 100.

The system 100 may further render the multi-layer graphical representation of the network on a Graphical User Interface (GUI) via a display (not shown in figure) for a user. The system 100 also includes one or more external devices (not shown in figure). In some embodiments, the central controller 101 interacts with the one or more external devices over a communication network for sending or receiving various data. The external devices include, but may not be limited to, a remote server, a digital device, or another computing system.

It should be noted that all such aforementioned modules 108-112 may be represented as a single module or a combination of different modules. Further, as will be appreciated by those skilled in the art, each of the modules 108-112 may reside, in whole or in parts, on one device or multiple devices in communication with each other. In some embodiments, each of the modules 108-112 may be implemented as dedicated hardware circuit comprising custom application-specific integrated circuit (ASIC) or gate arrays, off-the-shelf semiconductors such as logic chips, transistors, or other discrete components. Each of the modules 108-112 may also be implemented in a programmable hardware device such as a field programmable gate array (FPGA), programmable array logic, programmable logic device, and so forth. Alternatively, each of the modules 108-112 may be implemented in software for execution by various types of processors (e.g., processor 106). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for generating spatial data maps corresponding to a centralized wireless network. For example, the exemplary system 100 and the associated graph database system 101 may generate spatial data maps by the processes discussed herein. In particular, as will be appreciated by those of ordinary skill in the art, control logic and/or automated routines for performing the techniques and steps described herein may be implemented by the system 100 and the associated graph database system 101 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 2:
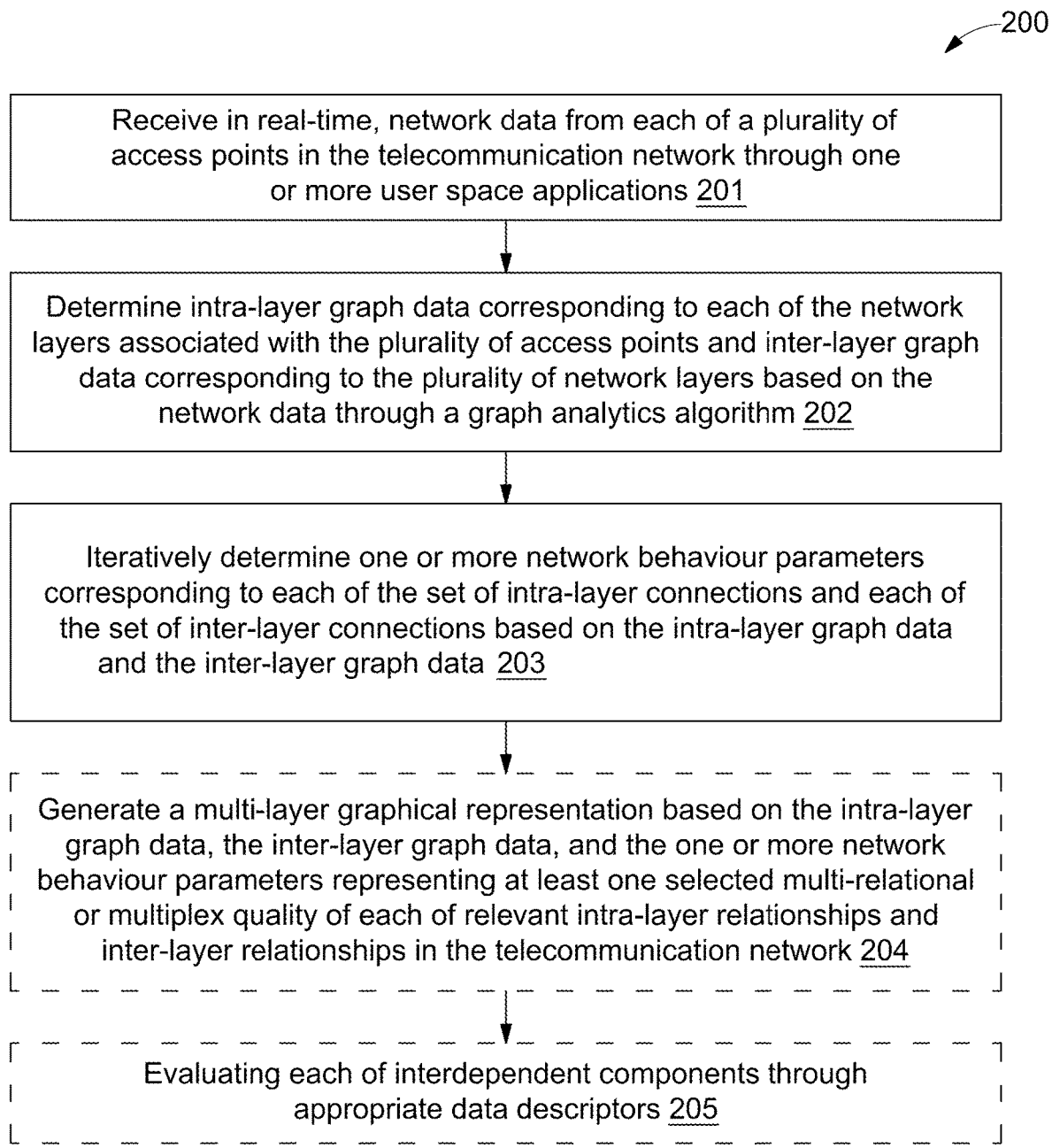
FIG. 2 illustrates a flow diagram of an exemplary control logic for analyzing and interacting with network behavior in a centralized telecommunication network, in accordance with some embodiments of the present disclosure.

Referring now to FIG. 2, an exemplary control logic 200 for analyzing and interacting with network behavior in a centralized telecommunication network is depicted via a flowchart, in accordance with some embodiments of the present disclosure. In an embodiment, the control logic 200 is implemented by a system, such as the system 100 or the central controller 101. As illustrated in the flowchart, the control logic 200 includes receiving in real-time, by the central controller 101, network data from each of a plurality of access points (such as, the access points 102, 103, and 104) in the telecommunication network through one or more user space applications, at step 201. The network data includes a plurality of network layers. The plurality of network layers includes one or more of physical network layers, logical network layers, conceptual network layers, or behavioral network layers. The network data includes inter-layer network data and intra-layer network data associated with the plurality of access points. The one or more user space applications are configured to establish a communication loop between each of the plurality of access points and the central controller.

The control logic 200 further includes determining, by the intra-layer graph module 108 and the inter-layer graph module 109, intra-layer graph data corresponding to each of the network layers associated with the plurality of access points and inter-layer graph data corresponding to the plurality of network layers based on the network data through a graph analytics algorithm, at step 202. The intra-layer graph data includes a set of intra-layer connections associated with the plurality of access points and the inter-layer graph data includes a set of inter-layer connections between the plurality of network layers. Each of the set of intra-layer connections and each of the set of inter-layer connections includes a source node and a target node connected via one or more edges.

The control logic 200 further includes iteratively determining, by the behavior parameters module 110, one or more network behavior parameters corresponding to each of the set of intra-layer connections and each of the set of inter-layer connections based on the intra-layer graph data and the inter-layer graph data, at step 203. The network behavior parameters may be determined through an AI model or other algorithms. In some embodiments, the AI module 112 selects the AI model from a group of AI models including a plurality of predictive models and a plurality of descriptive models based on each of the intra-layer graph data, the inter-layer graph data, and the one or more network behavior parameters.

In some embodiments, the control logic 200 includes generating, by the multi-layer graph module 111, a multi-layer graphical representation based on the intra-layer graph data, the inter-layer graph data, and the one or more network behavior parameters representing at least one selected multi-relational or multiplex quality of each of relevant intra-layer relationships and inter-layer relationships in the telecommunication network, at step 204. The multi-layer graphical representation includes a plurality of graph elements. The plurality of graph elements includes a plurality of objects, a plurality of nodes, and a plurality of edges.

In some embodiments, the relevant intra-layer relationships and inter-layer relationships are interdependent components in the telecommunication network interacting through dedicated relational channels. The interdependent components correspond to at least one of physical components, logical components, and conceptual components. Further, in such embodiments, the control logic 200 includes evaluating, by the multi-layer graph module 111, each of the interdependent components through appropriate data descriptors, at step 205.

In some embodiments, the control logic 200 includes monitoring, by the multi-layer graph module 111, each of the intra-layer graph data, the inter-layer graph data, and the one or more network behavior parameters at each of a plurality of predefined time intervals to obtain time-based information corresponding to each of the set of intra-layer connections and each of the set of inter-layer connections. In such embodiments, the control logic further includes predicting network parameters corresponding to a next time interval through a predictive model. In some embodiments, the control logic 200 includes iteratively determining, by the multi-layer graph module 111, one or more actions to alter network behavior of the telecommunication network based on each of the intra-layer graph data, the inter-layer graph data, and the one or more network behavior parameters.

Figure 3A:
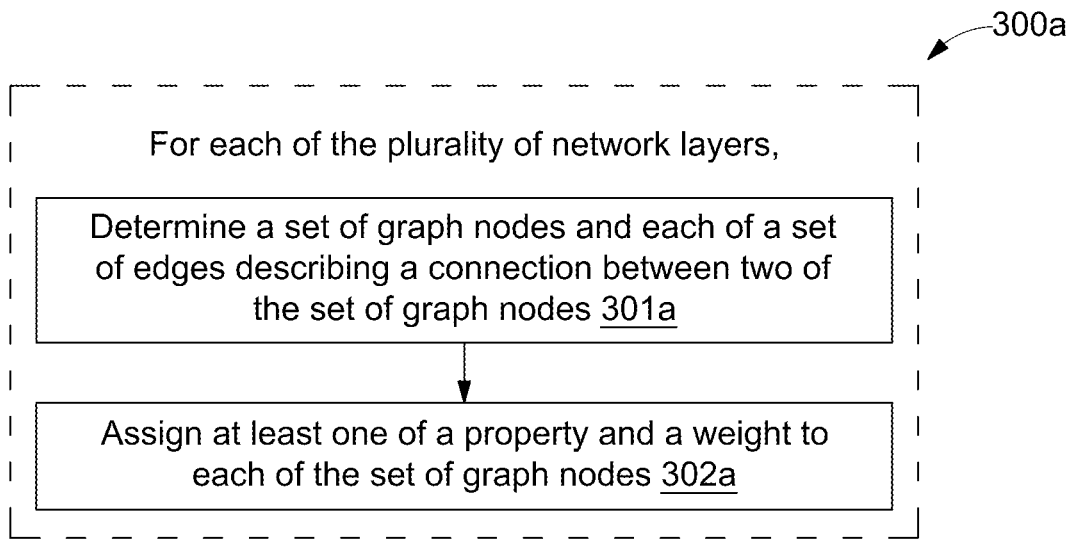
FIGS. 3A and 3B illustrate flow diagrams of exemplary control logics for determining intra-layer graph data and inter-layer graph data for a telecommunication network, in accordance with some embodiments of the present disclosure.
Figure 3B:
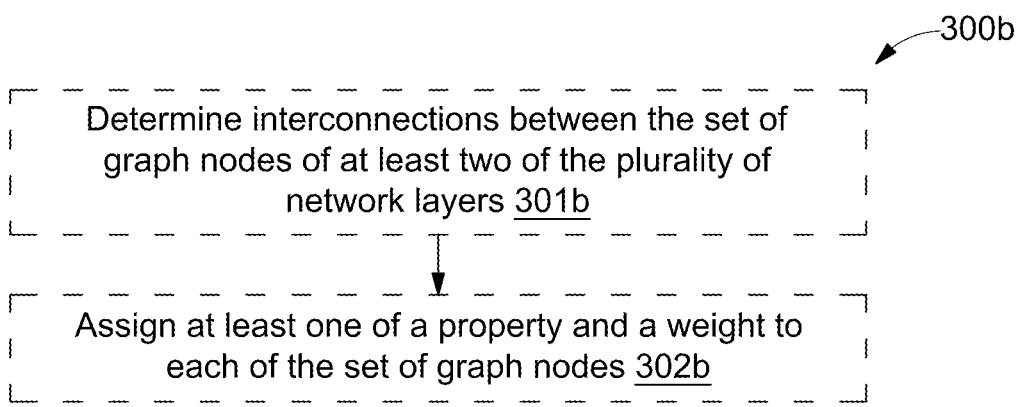

Referring now to FIGS. 3A and 3B, exemplary control logics for determining intra-layer graph data and inter-layer graph data for a telecommunication network are depicted via flowcharts, in accordance with some embodiments of the present disclosure. In an embodiment, the control logic 300 is implemented by a system, such as the system 100 or the central controller 101. In FIG. 3A, a control logic 300a for determining intra-layer graph data for a telecommunication network is disclosed. As illustrated in the flowchart, for each of the plurality of network layers, the control logic 300a includes determining a set of graph nodes and each of a set of edges describing a connection between two of the set of graph nodes, at step 301a. For each of the plurality of network layers, the control logic 300a further includes assigning at least one of a property and a weight to each of the set of graph nodes, at step 302a.

In FIG. 3B, a control logic 300b for determining inter-layer graph data for a telecommunication network is disclosed. As illustrated in the flowchart, the control logic 300b includes determining interconnections between the set of graph nodes of at least two of the plurality of network layers, at step 301b. The interconnections are described by a set of inter-layer edges. The control logic 300b further includes assigning at least one of a property and a weight to each of the set of graph nodes, at step 301b.

Figure 4:
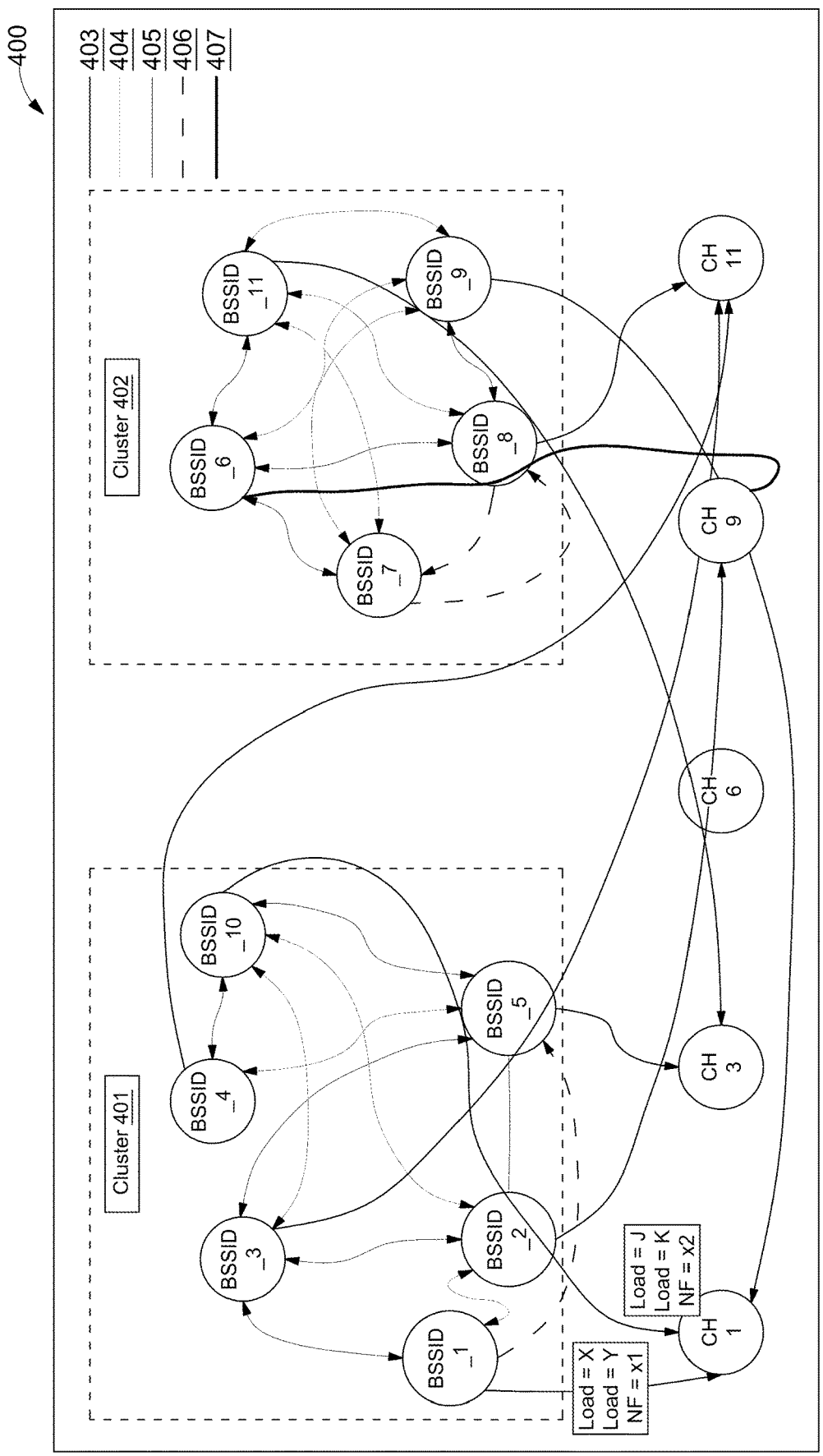
FIG. 4 is an exemplary intra-layer graphical representation for two clusters of access points in a telecommunication network, in accordance with an embodiment of the present disclosure.

Referring now to FIG. 4, an exemplary intra-layer graphical representation 400 for two clusters of access points in a telecommunication network is illustrated, in accordance with an embodiment of the present disclosure. The intra-layer graphical representation 400 includes a cluster 401 and a cluster 402. Each of the cluster 401 and the cluster 402 includes a plurality of nodes corresponding to a plurality of access points. The intra-layer graphical representation 400 represents a scalable telecommunication WLAN deployment with centralized, homogeneous network administration, where the plurality of nodes can be represented by Basic Service Set Identifiers (BSSIDs) of various radios for one or more WLAN access points placed at a layer for each BSSIDs operating radio band. For example, the cluster 401 includes nodes corresponding to BSSID_1, BSSID_2, BSSID_3, BSSID_4, BSSID_5, and BSSID_10, and the cluster 402 includes nodes corresponding to BSSID_6, BSSID_7, BSSID_8, BSSID_9, and BSSID_11. Other of the plurality of nodes can be represented by operating radio channels (for example, radio channels CH 1, CH 3, CH 6, CH 9, and CH 11) for wireless transmission. Such nodes can belong to a same set of nodes representing BSSIDs, differentiated by belonging to the same network layer, identifying an operating radio band.

Further, the intra-layer graphical representation 400 includes a plurality of edges 403, 404, 405, 406, and 407. In an embodiment, some intralayer edges represent various types of radio proximity relationships between BSSID nodes (such as, the edges 404, 405, and 406) and some intralayer edges represent various types of radio allocations relationships between BSSIDs and operating channels (such as, the edges 403 and 407).

Figure 5:
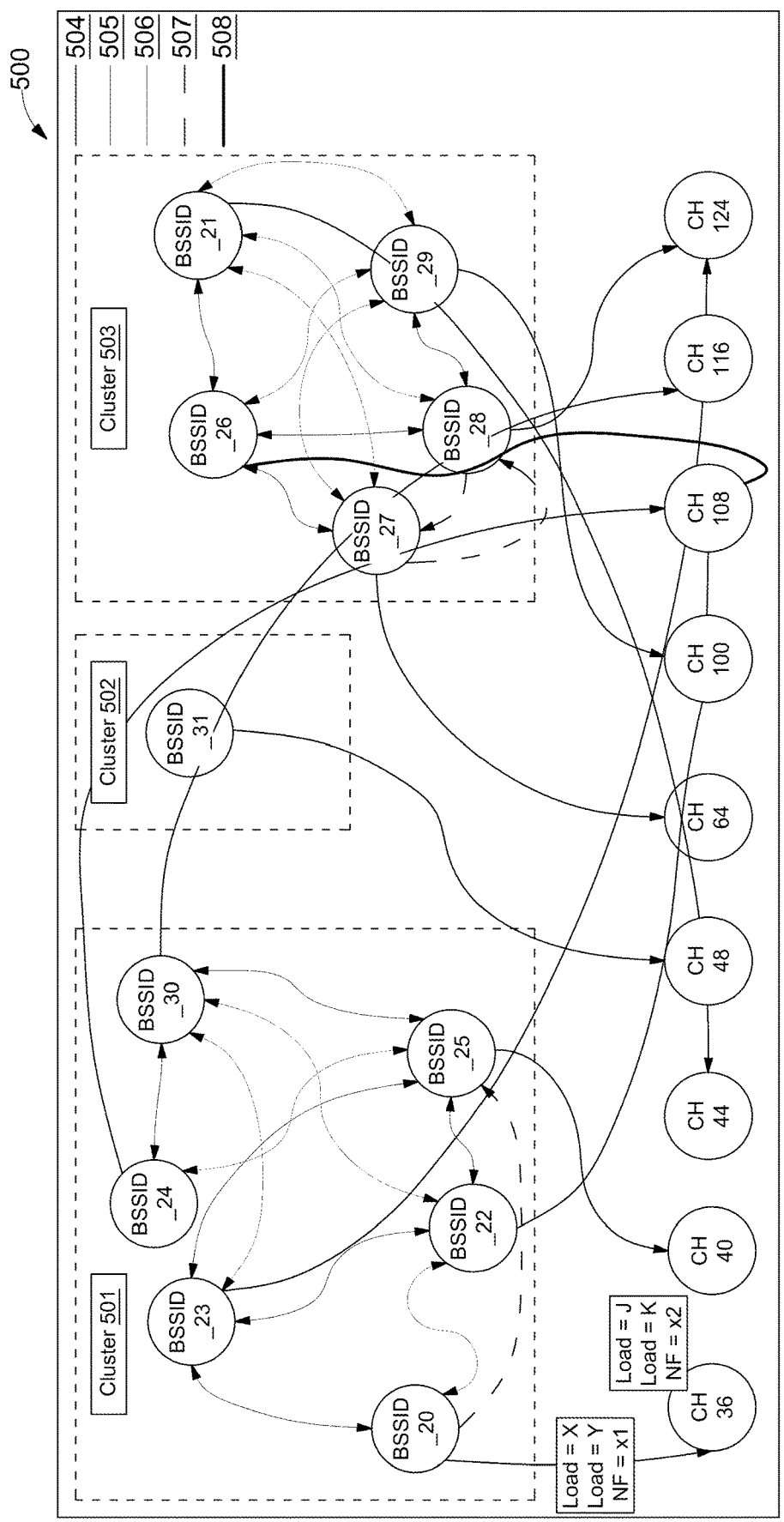
FIG. 5 is an exemplary intra-layer graphical representation of three clusters of access points in a telecommunication network, in accordance with some embodiments of the present disclosure.

Referring now to FIG. 5, an exemplary intra-layer graphical representation 500 of three clusters of access points in a telecommunication network is illustrated, in accordance with some embodiments of the present disclosure. The intra-layer graphical representation 500 includes a cluster 501, a cluster 502, and a cluster 503. Each of the cluster 501, the cluster 502, and the cluster 503 includes a plurality of nodes corresponding to a plurality of access points. The intra-layer graphical representation 500 represents a scalable telecommunication WLAN deployment with centralized, homogeneous network administration, where the plurality of nodes can be represented by Basic Service Set Identifiers (BSSIDs) of various radios for one or more WLAN access points placed at a layer for each BSSIDs operating radio band. For example, the cluster 501 includes nodes corresponding to BSSID_20, BSSID_22, BSSID_23, BSSID_24, BSSID_25, and BSSID_30, the cluster 502 includes BSSID_31, and the cluster 503 includes nodes corresponding to BSSID_21, BSSID_26, BSSID_27, BSSID_28, and BSSID_29. Other of the plurality of nodes can be represented by operating radio channels (for example, radio channels CH 36, CH 40, CH 44, CH 48, CH 64, CH 100, CH 108, CH 116, and CH 124) for wireless transmission. Such nodes can belong to a same set of nodes representing BSSIDs, differentiated by belonging to the same network layer, identifying an operating radio band.

Further, the intra-layer graphical representation 500 includes a plurality of edges 504, 505, 506, 507, and 508. In an embodiment, some intralayer edges represent various types of radio proximity relationships between BSSID nodes (such as, the edges 505, 506, and 507) and some intralayer edges represent various types of radio allocations relationships between BSSIDs and operating channels (such as, the edges 504 and 508).

Figure 6:
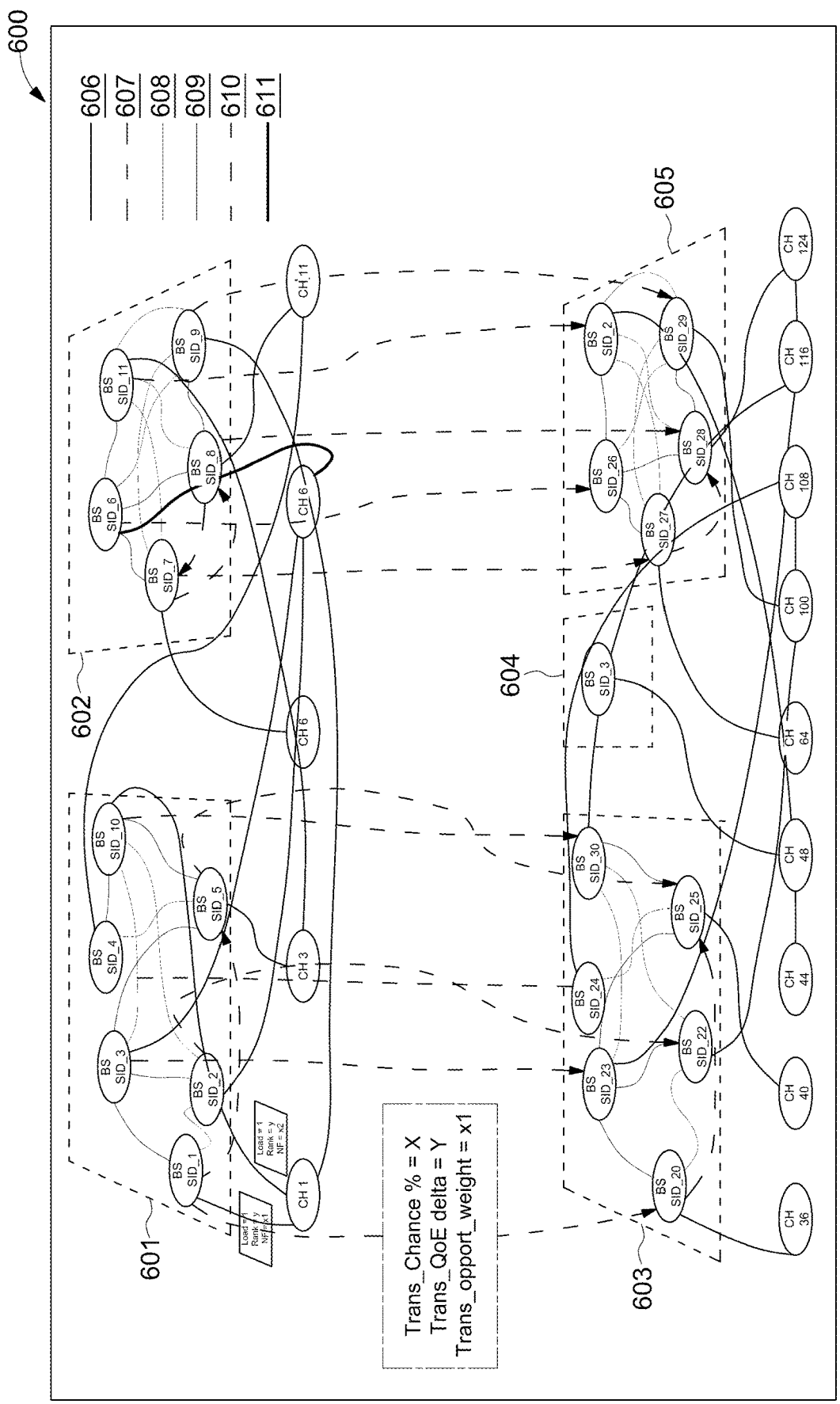
FIG. 6 is an exemplary inter-layer graphical representation for two network layers in a telecommunication network, in accordance with an embodiment of the present disclosure.

Referring now to FIG. 6, an exemplary inter-layer graphical representation 600 for two network layers in a telecommunication network is illustrated, in accordance with an embodiment of the present disclosure. The inter-layer graphical representation 600 includes a cluster 601, a cluster 602, a cluster 603, a cluster 604, and a cluster 605. Each of the cluster 601, the cluster 602, the cluster 603, the cluster 604, and the cluster 605 includes a plurality of nodes corresponding to a plurality of access points.

It should be noted that the cluster 601 and the cluster 602 belong to a first network layer, and the cluster 603, the cluster 604, and the cluster 605 belong to a second network layer. In an embodiment, the first network layer is analogous to the intra-layer graphical representation 400 and the second network layer is analogous to the intra-layer graphical representation 500. Further, the inter-layer graphical representation 600 includes interlayer connections between BSSID nodes in different crossed network layers representing load balancing conditions or opportunities for clients that are able to make a radio connection transition from one BSSID to another BSSID. It should be noted that the load balancing conditions are dependent on inherent dynamic properties of the plurality of nodes.

Further, the plurality of nodes corresponding to BSSIDs and radio channels in different crossed network layers (i.e., the first network layer and the second network layer) and sharing same operating bands can be seen as distinct multiplex graphs (networks) that are interconnecting by means of load balancing opportunities and interlayer connections to form a multi-layer network. It must be noted that each of the plurality of nodes are considered as permanent, i.e., presence of the plurality of nodes in the inter-layer graphical representation 600 is time invariant.

Further, the inter-layer graphical representation 600 includes a plurality of edges 606, 607, 608, 609, 610, and 611. In an embodiment, some intralayer edges represent various types of radio proximity relationships between BSSID nodes (such as, the edges 607, 608, and 609) and some intralayer edges represent various types of radio allocations relationships between BSSIDs and operating channels (such as, the edges 606 and 611). Further, an inter-layer edge 610 represents relationships between the first network layer and the second network layer.

Figure 7:
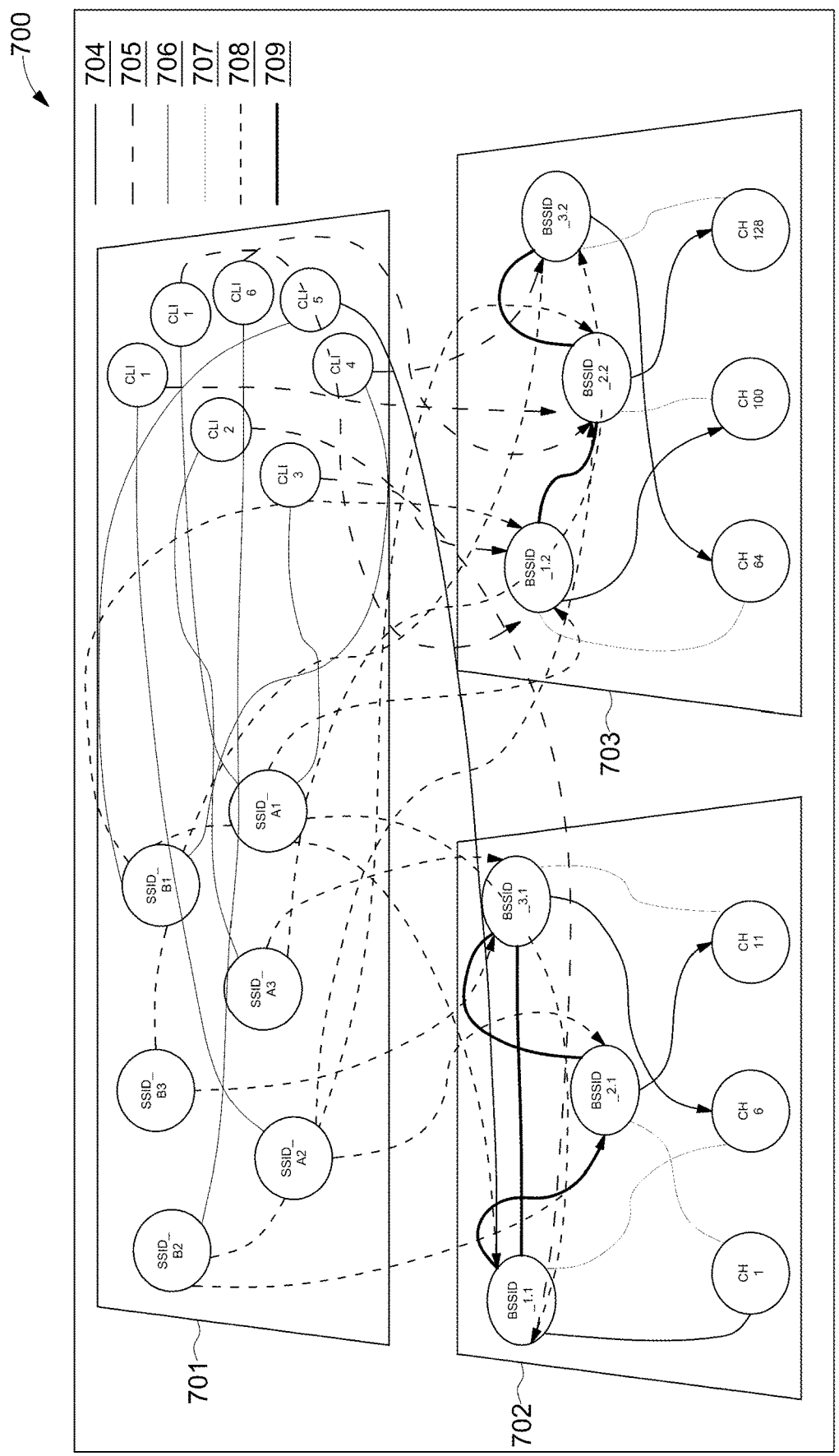
FIG. 7 is an exemplary inter-layer graphical representation for two network layers in a telecommunication network, in accordance with an embodiment of the present disclosure.

Referring now to FIG. 7, an exemplary inter-layer graphical representation 700 for network layers in a telecommunication network is illustrated, in accordance with an embodiment of the present disclosure. The inter-layer graphical representation 700 includes a network layer 701, a network layer 702, and a network layer 703. Based on use cases, considering the same, scalable and centrally managed WLAN deployment, crossed layers can be augmented considering new layers. The network layer 701 represents a plurality of nodes corresponding to WLAN network Service Set identifiers (SSIDs) (for example, SSID_A1, SSID_A2, SSID_A3, SSID_B1, SSID_B2, and SSID_B3). Further, the network layer 701 represents a plurality of client nodes (for example, CLI 1, CLI 2, CLI 3, CLI 4, CLI 5, and CLI 6) connected to SSIDs. The network layer 702 includes a plurality of BSSID nodes (for example, BSSID_1.1, BSSID_2.1, and BSSID_3.1) and a plurality of radio channel nodes (for example, CH 1, CH 6, and CH 11). The network layer 703 includes a plurality of BSSID nodes (for example, BSSID_1.2, BSSID_2.2, and BSSID_3.2) and a plurality of radio channel nodes (for example, CH 64, CH 100, and CH 128).

The inter-layer graphical representation 700 further includes a plurality of edges 704, 705, 706, 707, 708, and 709. The edges 704 and 707 represent intra-layer relationships among BSSID nodes and radio channel nodes. The edges 709 represent intra-layer relationships among BSSID nodes. The edges 708 represent inter-layer relationships among SSID nodes of the network layer 701 and BSSID nodes of the network layers 702 and 703. The edges 705 represent inter-layer relationships among client nodes of the network layer 701 and the BSSID nodes of the network layers 702 and 703. The edges 706 represent intralayer relationships between client nodes and SSID nodes (representing SSIDs granting services to the clients) in the network layer 701. It may be noted that intralayer edges do not exist among client nodes or among SSID nodes. SSID nodes and client nodes can vary, i.e., be dynamically added or deleted to the inter-layer graphical representation 700.

Figure 8:
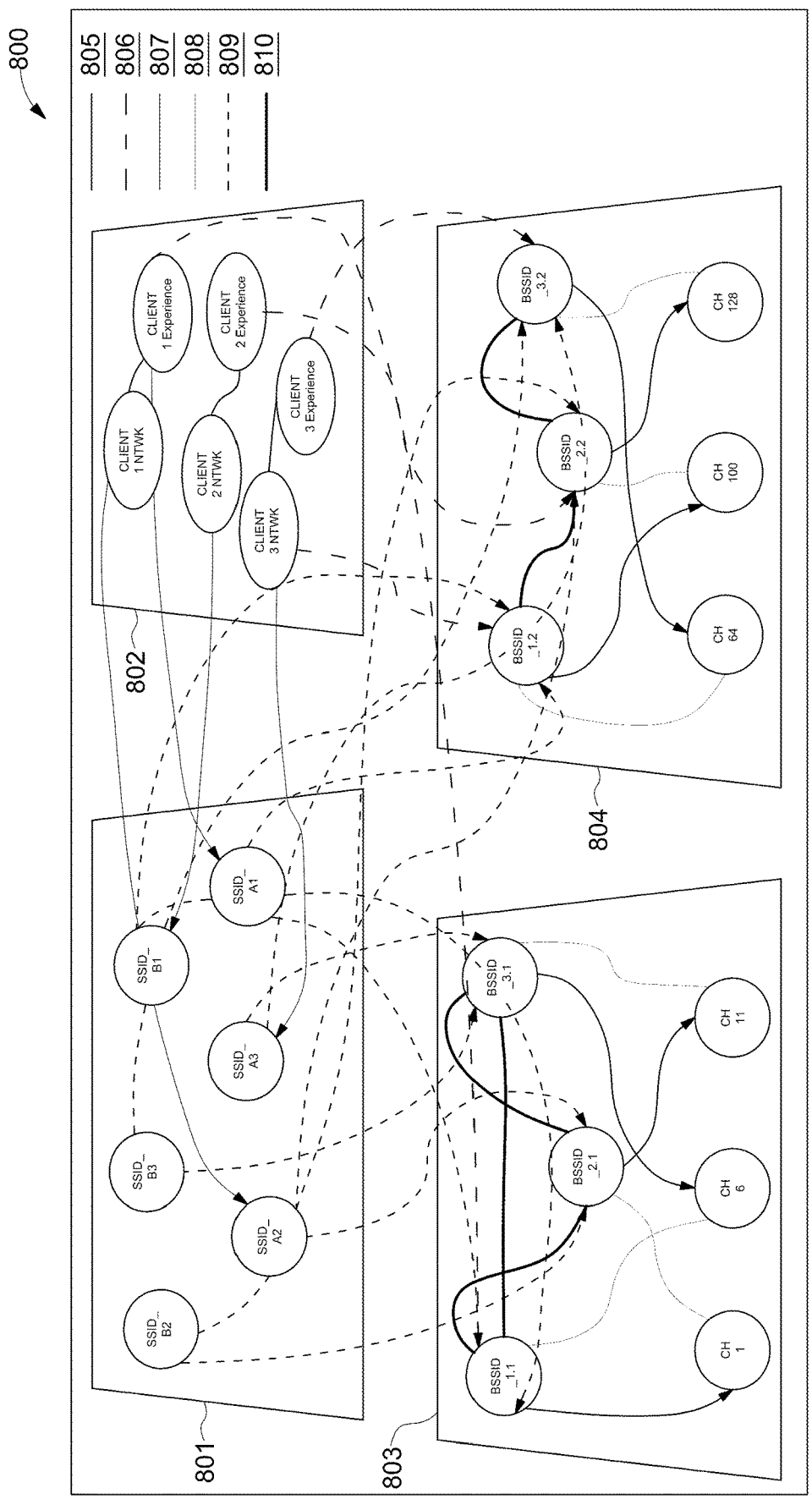
FIG. 8 is an exemplary inter-layer graphical representation for two network layers in a telecommunication network, in accordance with an embodiment of the present disclosure.

Referring now to FIG. 8, an exemplary inter-layer graphical representation 800 for two network layers in a telecommunication network is illustrated, in accordance with an embodiment of the present disclosure. The inter-layer graphical representation 800 includes a network layer 801, a network layer 802, a network layer 803, and a network layer 804. Based on use cases, considering the same, scalable and centrally managed WLAN deployment, crossed layers can be further augmented considering new layers. The network layer 801 includes a plurality of SSID nodes (for example, SSID_A1, SSID_A2, SSID_A3, SSID_B1, SSID_B2, and SSID_B3). The network layer 802 includes a plurality of client network nodes and a plurality of client experience nodes (for example, CLIENT 1 NTWK, CLIENT 2 NTWK, CLIENT 3 NTWK, CLIENT 1 Experience, CLIENT 2 Experience, and CLIENT 2 Experience). Each of the plurality of client network nodes corresponds to a client network connection. The network layer 803 includes a plurality of BSSID nodes (for example, BSSID_1.1, BSSID_2.1, and BSSID_3.1) and a plurality of radio channel nodes (for example, CH 1, CH 6, and CH 11). The network layer 804 includes a plurality of BSSID nodes (for example, BSSID_1.2, BSSID_2.2, and BSSID_3.2) and a plurality of radio channel nodes (for example, CH 64, CH 100, and CH 128).

Further, the inter-layer graphical representation 800 includes a plurality of edges 805, 806, 807, 808, 809, and 810. The edges 805 represent an intralayer relationship the plurality of client experience nodes with the plurality of clients network nodes. Further, the edges 807 represent interlayer relationships among the plurality of client network nodes and SSID nodes (representing SSIDs granting services to the clients in the network). The edges 806 represent interlayer relationships between client experience nodes and BSSID nodes (representing BSSIDs granting services to the clients in the network). Intralayer edges do not exist among SSID nodes. The edges 809 represent interlayer relationship among SSID nodes and BSSID nodes. The edges 808 represent intralayer relationships among BSSID nodes and radio channel nodes. The edges 810 represent intralayer relationships among BSSID nodes. It should be noted that SSID nodes and client network nodes client experience nodes can vary, i.e., be dynamically added or deleted.

In the above mentioned embodiments, nodes and edges are conveniently labelled or weighted, based on requirements of a specific algorithm applied to a graph database. The requirements of the specific algorithm are, in turn, based on a typed of information examined into the graph database and on an objective function that is considered and applied to achieve an intended goal.

Additionally, in the above mentioned embodiments, incorporating a time dimension representation into the graph database can be desirable for taking more efficient decisions and providing additional insights. For example, using time-based information, a predictive algorithm can forecast status of one or more network layers of the graph database (e.g., access point utilization layer) in future or predict an effect of an action on the multi-layer graphical representation (e.g., effect of steering load from one access point to another or adding/removing an access point from the network). The time dimension representation may be incorporated into the graph database in various manners.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
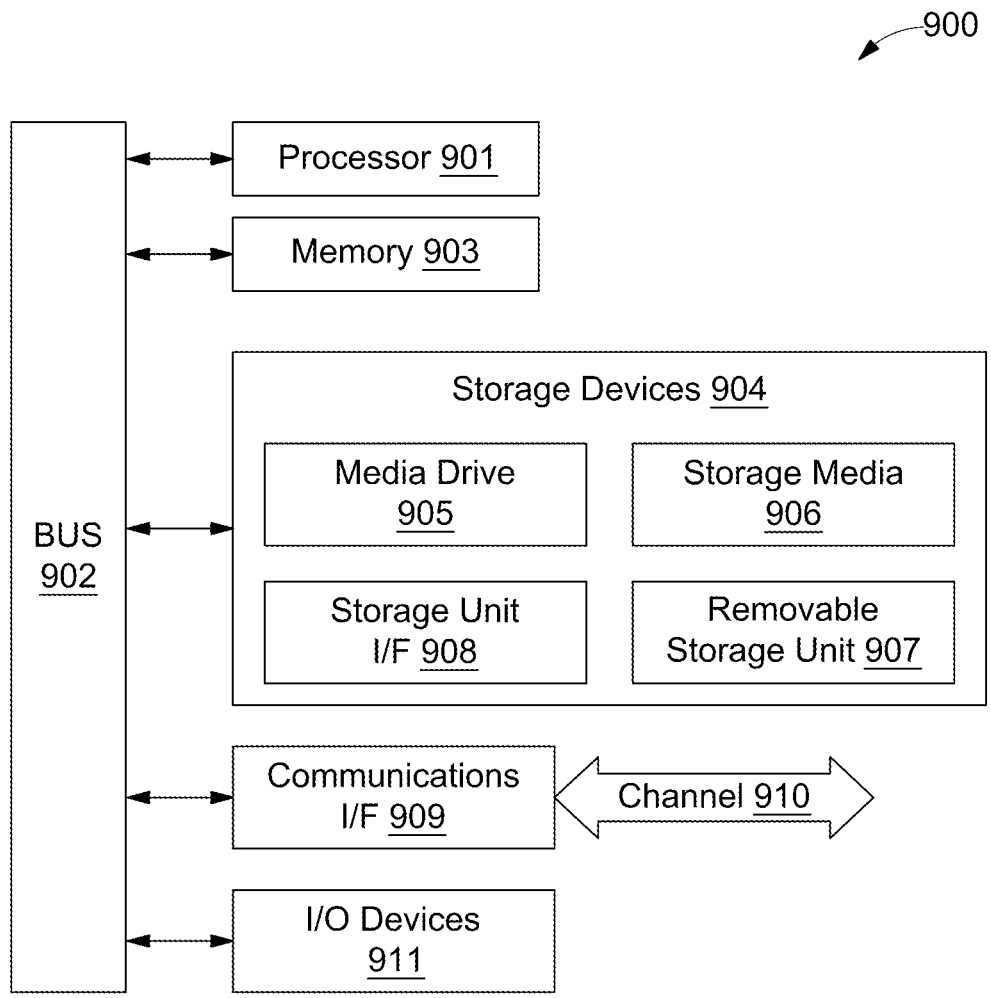
FIG. 9 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, an exemplary computing system 900 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 900 may represent, for example, a user device such as a desktop, a laptop, a mobile phone, personal entertainment device, DVR, and so on, or any other type of special or general-purpose computing device as may be desirable or appropriate for a given application or environment. The computing system 900 may include one or more processors, such as a processor 901 that may be implemented using a general or special purpose processing engine such as, for example, a microprocessor, microcontroller or other control logic. In this example, the processor 901 is connected to a bus 902 or other communication medium. In some embodiments, the processor 901 may be an Artificial Intelligence (AI) processor, which may be implemented as a Tensor Processing Unit (TPU), or a graphical processor unit, or a custom programmable solution Field-Programmable Gate Array (FPGA).

The computing system 900 may also include a memory 903 (main memory), for example, Random Access Memory (RAM) or other dynamic memory, for storing information and instructions to be executed by the processor 901. The memory 903 also may be used for storing temporary variables or other intermediate information during execution of instructions to be executed by the processor 901. The computing system 900 may likewise include a read only memory ("ROM") or other static storage device coupled to bus 902 for storing static information and instructions for the processor 901.

The computing system 900 may also include a storage device 904, which may include, for example, a media drives 905 and a removable storage interface. The media drive 905 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 906 may include, for example, a hard disk, magnetic tape, flash drive, or other fixed or removable medium that is read by and written to by the media drive 905. As these examples illustrate, the storage media 906 may include a computer-readable storage medium having stored there in particular computer software or data.

In alternative embodiments, the storage devices 904 may include other similar instrumentalities for allowing computer programs or other instructions or data to be loaded into the computing system 900. Such instrumentalities may include, for example, a removable storage unit 907 and a storage unit interface 908, such as a program cartridge and cartridge interface, a removable memory (for example, a flash memory or other removable memory module) and memory slot, and other removable storage units and interfaces that allow software and data to be transferred from the removable storage unit 907 to the computing system 900.

The computing system 900 may also include a communications interface 909. The communications interface 909 may be used to allow software and data to be transferred between the computing system 900 and external devices. Examples of the communications interface 909 may include a network interface (such as an Ethernet or other NIC card), a communications port (such as for example, a USB port, a micro USB port), Near field Communication (NFC), etc. Software and data transferred via the communications interface 909 are in the form of signals which may be electronic, electromagnetic, optical, or other signals capable of being received by the communications interface 909. These signals are provided to the communications interface 909 via a channel 910. The channel 910 may carry signals and may be implemented using a wireless medium, wire or cable, fiber optics, or other communications medium. Some examples of the channel 910 may include a phone line, a cellular phone link, an RF link, a Bluetooth link, a network interface, a local or wide area network, and other communications channels.

The computing system 900 may further include Input/Output (I/O) devices 911. Examples may include, but are not limited to a display, keypad, microphone, audio speakers, vibrating motor, LED lights, etc. The I/O devices 911 may receive input from a user and also display an output of the computation performed by the processor 901. In this document, the terms "computer program product" and "computer-readable medium" may be used generally to refer to media such as, for example, the memory 903, the storage devices 904, the removable storage unit 907, or signal(s) on the channel 910. These and other forms of computer-readable media may be involved in providing one or more sequences of one or more instructions to the processor 901 for execution. Such instructions, generally referred to as "computer program code" (which may be grouped in the form of computer programs or other groupings), when executed, enable the computing system 900 to perform features or functions of embodiments of the present invention.

In an embodiment where the elements are implemented using software, the software may be stored in a computer-readable medium and loaded into the computing system 900 using, for example, the removable storage unit 907, the media drive 905 or the communications interface 909. The control logic (in this example, software instructions or computer program code), when executed by the processor 901, causes the processor 901 to perform the functions of the invention as described herein.

Thus, the disclosed method and system try to overcome the technical problem of analyzing and interacting with network behavior in a centralized telecommunication network. The method and system implement a novel system for reactive or proactive management of elements. In centralized network analytics systems, quality and quantity of insight potentially made available through the disclosed method and system, also driven by a capability of selecting and controlling some key system monitoring parameters, promises to be a booster for analytics performances. Additionally, multi-graph based analytics and multi-graph based processing flexibly offers database services with massively efficient graph analytics algorithms and processing techniques for analysis, inference and control of any data coming from the network. When, in particular, the observed and controlled data belong to the radio transmission layer—whose command is impaired by many affecting factors, often external to the transmission system itself—the described system, with its insightful capabilities of observing and driving relationships between network descriptors, unlocks great potential for optimization and lower costs of operations, growing a more environmentally aware class of operations, developing customized and non-trivial insights from network data, developing innovative sets of network custom self-organization, self-optimization and self-healing features, developing an ameliorated tailoring of the telecommunication network, leading to good returns on CAPEX/OPEX side. Further, the method and system aim at realizing potential for considerable reduction of OPEX due to benefits from centralized deployment of embodiments coupled with great optimization opportunities for the network operations.

As will be appreciated by those skilled in the art, the techniques described in the various embodiments discussed above are not routine, or conventional, or well understood in the art.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for analyzing and interacting with network behavior in a centralized telecommunication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for analyzing and interacting with network behavior in a centralized telecommunication network, the method comprising:

receiving in real-time, by a graph database system, network data from each of a plurality of access points in the telecommunication network through one or more user space applications running on the plurality of access points, wherein the network data comprises a plurality of network layers, wherein the plurality of network layers comprises one or more of physical network layers, logical network layers, conceptual network layers, or behavioral network layers, wherein the network data comprises inter-layer network data and intra-layer network data associated with the plurality of access points, and wherein the one or more user space applications are configured to establish a communication loop between each of the plurality of access points and a central controller;

determining, by the graph database system, intra-layer graph data corresponding to each of the plurality of network layers associated with the plurality of access points and inter-layer graph data corresponding to the plurality of network layers based on the network data through a graph analytics algorithm, wherein the intra-layer graph data comprises a set of intra-layer connections associated with the plurality of access points and the inter-layer graph data comprises a set of inter-layer connections between the plurality of network layers, wherein each of the set of intra-layer connections and each of the set of inter-layer connections comprises a source node and a target node connected via one or more edges;

generating a multi-layer graphical representation based on the intra-layer graph data, the inter-layer graph data, and the one or more network behavior parameters representing at least one selected multi-relational or multiplex quality of each of relevant intra-layer relationships and inter-layer relationships in the telecommunication network, wherein the multi-layer graphical representation comprises a plurality of graph elements, and wherein the plurality of graph elements comprises a plurality of objects, a plurality of nodes, and a plurality of edges;

iteratively determining, by the graph database system, one or more network behavior parameters corresponding to each of the set of intra-layer connections and each of the set of inter-layer connections based on the intra-layer graph data and the inter-layer graph data;

iteratively determining one or more actions to alter network behavior corresponding to the telecommunication network based on each of the intra-layer graph data, the inter-layer graph data, the one or more network behavior parameters, and a set of one or more objectives predefined by a set of one or more anteriorly developed strategies; and optimizing the telecommunication network based on the one or more actions, wherein optimizing the telecommunication network further comprises controlling services affecting the values of the plurality of graph elements.

2. The method of claim 1, wherein the relevant intra-layer relationships and inter-layer relationships are interdependent components in the telecommunication network interacting through dedicated relational channels, and wherein the interdependent components correspond to at least one of physical components, logical components, and conceptual components, further comprising:

evaluating each of the interdependent components through appropriate data descriptors.

3. The method of claim 1, further comprising monitoring each of the intra-layer graph data, the inter-layer graph data, and the one or more network behavior parameters at each of a plurality of predefined time intervals to obtain time-based information corresponding to each of the set of intra-layer connections and each of the set of inter-layer connections.

4. The method of claim 3, further comprising predicting network parameters corresponding to a next time interval through a predictive model.

5. The method of claim 1, wherein determining intra-layer graph data and inter-layer graph data comprises:

for each of the plurality of network layers,
determining a set of graph nodes and each of a set of edges describing a connection between two of the set of graph nodes; and assigning at least one property and a weight to each of the set of graph nodes.

6. The method of claim 5, further comprising:
determining interconnections between the set of graph nodes of at least two of the plurality of network layers, wherein the interconnections are described by a set of inter-layer edges; and assigning at least one of a property and a weight to each of the set of graph nodes.

7. The method of claim 1, further comprising selecting an Al model from a group of Al models comprising a plurality of predictive models and a plurality of descriptive models based on each of the intra-layer graph data, the inter-layer graph data, and the one or more network behavior parameters.

8. A system for analyzing and interacting with network behavior in a centralized telecommunication network, the system comprising:

a processor; and a memory communicatively coupled to the processor, wherein the memory stores processor instructions, which when executed by the processor, cause the processor to:

receive in real-time, network data from each of a plurality of access points in the telecommunication network through one or more user space applications, wherein the network data comprises a plurality of network layers, wherein the plurality of network layers comprises one or more of physical network layers, logical network layers, conceptual network layers, or behavioral network layers, wherein the network data comprises inter-layer network data and intra-layer network data associated with the plurality of access points, and wherein the one or more user space applications are configured to establish a communication loop between each of the plurality of access points and a central controller;

determine intra-layer graph data corresponding to each of the plurality of network layers associated with the plurality of access points and inter-layer graph data corresponding to the plurality of network layers based on the network data through a graph analytics algorithm, wherein the intra-layer graph data comprises a set of intra-layer connections associated with the plurality of access points and the inter-layer graph data comprises a set of inter-layer connections between the plurality of network layers, wherein each of the set of intra-layer connections and each of the set of inter-layer connections comprises a source node and a target node connected via one or more edges; and generate a multi-layer graphical representation based on the intra-layer graph data, the inter-layer graph data, and the one or more network behavior parameters representing at least one selected multi-relational or multiplex quality of each of relevant intra-layer relationships and inter-layer relationships in the telecommunication network, wherein the multi-layer graphical representation comprises a plurality of graph elements, and wherein the plurality of graph elements comprises a plurality of objects, a plurality of nodes, and a plurality of edges;

iteratively determine one or more network behavior parameters corresponding to each of the set of intra-layer connections and each of the set of inter-layer connections based on the intra-layer graph data and the inter-layer graph data ;

iteratively determine one or more actions to alter network behavior corresponding to the telecommunication network based on each of the intra-layer graph data, the inter-layer graph data, the one or more network behavior parameters, and a set of one or more objectives predefined by a set of one or more anteriorly developed strategies; and optimize the telecommunication network based on the one or more actions, wherein optimizing the telecommunication network further comprises controlling services affecting the values of the plurality of graph elements.

9. The system of claim 8, wherein the relevant intra-layer relationships and inter-layer relationships are interdependent components in the telecommunication network interacting through dedicated relational channels, and wherein the interdependent components correspond to at least one of physical components, logical components, and conceptual components, and wherein the processor-executable instructions further cause the processor to:

evaluate each of the interdependent components through appropriate data descriptors.

10. The system of claim 8, wherein the processor-executable instructions further cause the processor to monitor each of the intra-layer graph data, the inter-layer graph data, and the one or more network behavior parameters at each of a plurality of predefined time intervals to obtain time-based information corresponding to each of the set of intra-layer connections and each of the set of inter-layer connections.

11. The system of claim 10, wherein the processor-executable instructions further cause the processor to predict network parameters corresponding to a next time interval through a predictive model.

12. The system of claim 8, wherein to determine intra-layer graph data and inter-layer graph data, the processor-executable instructions cause the processor to:

for each of the plurality of network layers,
determine a set of graph nodes and each of a set of edges describing a connection between two of the set of graph nodes; and
assign at least one of a property and a weight to each of the set of graph nodes.

13. The system of claim 12, wherein the processor-executable instructions further cause the processor to:

determine interconnections between the set of graph nodes of at least two of the plurality of network layers, wherein the interconnections are described by a set of inter-layer edges; and
assign at least one property and a weight to each of the set of graph nodes.

14. The system of claim 8, wherein the processor-executable instructions further cause the processor to select an AI model from a group of AI models comprising a plurality of predictive models and a plurality of descriptive models based on each of the intra-layer graph data, the inter-layer graph data, and the one or more network behavior parameters.

15. A non-transitory computer-readable medium storing computer-executable instructions for analyzing and interacting with network behavior in a centralized telecommunication network, the computer-executable instructions configured for:

receiving in real-time, network data from each of a plurality of access points in the telecommunication network through one or more user space applications, wherein the network data comprises a plurality of network layers, wherein the plurality of network layers comprises one or more of physical network layers, logical network layers, conceptual network layers, or behavioral network layers, wherein the network data comprises inter-layer network data and intra-layer network data associated with the plurality of access points, and wherein the one or more user space applications are configured to establish a communication loop between each of the plurality of access points and a central controller;

determining intra-layer graph data corresponding to each of the plurality of network layers associated with the plurality of access points and inter-layer graph data corresponding to the plurality of network layers based on the network data through a graph analytics algorithm, wherein the intra-layer graph data comprises a set of intra-layer connections associated with the plurality of access points and the inter-layer graph data comprises a set of inter-layer connections between the plurality of network layers, wherein each of the set of intra-layer connections and each of the set of inter-layer connections comprises a source node and a target node connected via one or more edges;

generating a multi-layer graphical representation based on the intra-layer graph data, the inter-layer graph data, and the one or more network behavior parameters representing at least one selected multi-relational or multiplex quality of each of relevant intra-layer relationships and inter-layer relationships in the telecommunication network, wherein the multi-layer graphical representation comprises a plurality of graph elements, and wherein the plurality of graph elements comprises a plurality of objects, a plurality of nodes, and a plurality of edges;

iteratively determining one or more network behavior parameters corresponding to each of the set of intra-layer connections and each of the set of inter-layer connections based on the intra-layer graph data and the inter-layer graph data;

iteratively determining one or more actions to alter network behavior corresponding to the telecommunication network based on each of the intra-layer graph data, the inter-layer graph data, the one or more network behavior parameters, and a set of one or more objectives predefined by a set of one or more anteriorly developed strategies; and optimizing the telecommunication network based on the one or more actions wherein optimizing the telecommunication network further comprises controlling services affecting the values of the plurality of graph elements.

* * * * *